UNITED STATES PATENT OFFICE.

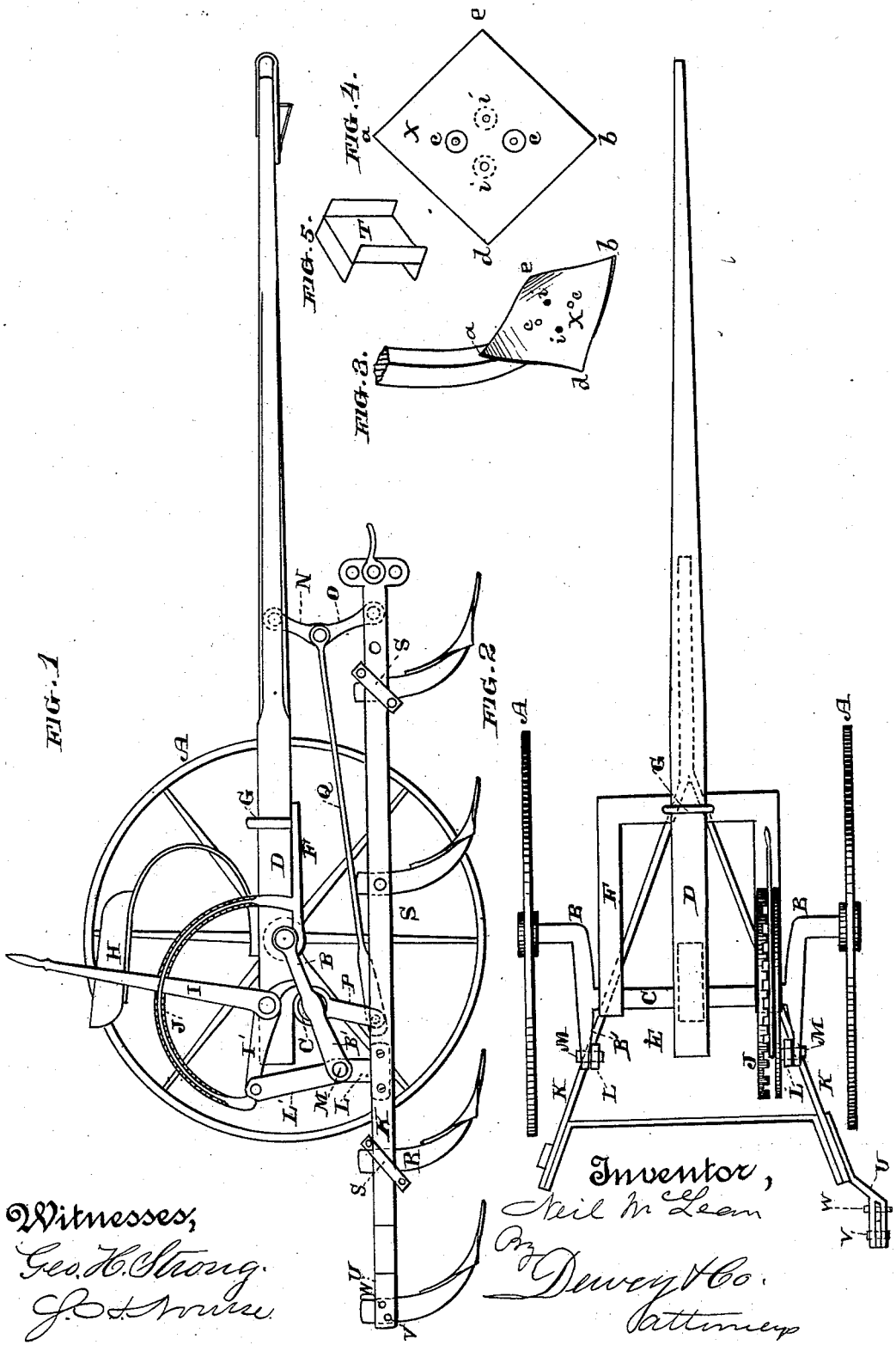

NEIL McLEAN, OF WATSONVILLE, CALIFORNIA.

SULKY-CULTIVATOR.

SPECIFICATION forming part of Letters Patent No. 302,347, dated July 22, 1884.

Application filed March 20, 1884. (No model.)

*To all whom it may concern:*

Be it known that I, NEIL McLEAN, of Watsonville, county of Santa Cruz, and State of California, have invented an Improvement in Sulky Orchard-Cultivators; and I hereby declare the following to be a full, clear, and exact description thereof.

My invention relates to an improved implement which I call a "sulky orchard-cultivator."

It consists, mainly, in certain details of construction, embracing the connection of the frame with the wheel-axle, the attachment of the teeth or shovel-shanks to the frame, an extension-arm with a hinged tooth, a peculiar construction for the teeth or shovels and their attachment to the shanks, and certain details of construction, all of which will be more fully explained by reference to the accompanying drawings, in which—

Figure 1 is a side elevation with right-hand wheel removed, showing my machine. Fig. 2 is a plan or top view. Fig. 3 is a view of one of the shovels with its shank. Fig. 4 is a plan of one of the shovels. Fig. 5 is a view of the plate or clamp by which the shovel-shanks are held to the frame.

A A are the bearing-wheels of my machine, with the axle bent at B B, so as to form a long central crank-arm, C, to which the rear end of the pole D is loosely connected by means of a box, E, secured to the pole, and in which the part C turns. A bent iron frame, F, has the rear ends similarly journaled upon the crank-arm C, and the front part, which crosses beneath the pole, is secured to it by a strong staple, G, so that the pole and frame form a single part, the seat H being supported from the rear end of the pole, while the lever I, by which the cultivator is raised and lowered, and the holding-racks J are supported from the rear end of one side of the frame F. The cranked portions B B of the axle have extensions B' behind the part C, and the rear portion of the cultivator-frame K is suspended from these extensions by links L, bolted to the frame and having pins M passing through their upper ends from the extensions B'. The lever I, which is formed like a bell-crank, with its angle fulcrumed, as before described, upon the frame F, has a short arm, I', extending back above one of the extensions B', and it is connected with the pin M upon it by the links L', so that when the lever is thrown forward it raises the cultivator-frame about the wheel-axis as a fulcrum, and when thrown back it lowers the frame and allows the teeth or shovels to enter the ground. The cultivator-frame K is shown in the present instance of triangular form, with its apex toward the front. The front end of the frame is connected with and suspended from the pole by two links, N and O, the meeting ends of which are pivoted together, while the opposite ends are pivoted one to the beam and one to the frame, as shown. A short arm, P, is secured to the part C of the axle and projects downward. The end of this arm is connected with the meeting ends of the links N and O by a rod, Q, and the action of this rod upon the jointed arms N and O is such as to raise and lower the front end of the cultivator-frame K simultaneously with the rear end when the lever I is thrown forward or back. The shanks or standards R of the cultivator teeth or shovels are secured to the frame K by bolts or clamps S, which embrace the frame and shank, and are drawn tight by nuts, or they may be held by bolts passing through them and the frame and held by nuts. Between the shank and the frame is an iron plate, T, having two sides bent, so as to clasp the upper and lower edges of the frame, while the other two are bent in an opposite direction, so as to clasp the sides of the shank. This, when the shanks are bolted on, will prevent any looseness or twisting of the shank.

In order to run as close to trees and vines as possible without endangering them by the wheels, extensions U are bolted to or formed with the main frame, and project beyond the line of the wheels. In each of these extensions the shank of a tooth is pinned by a bolt, V, upon which it turns, and a breaking-pin, W, of any suitable material, passes through another hole a short distance from the first, and holds the shank and tooth in place against any ordinary strain. If, however, the tooth should strike a root or rigid impediment, as it might if driven very close to the trees, the pin W would break and allow the tooth to swing back out of the way until the obstruction was passed. The lower ends of the shanks or standards are curved forward, so as to present a concave front. The shovels or plates X are made square, and, when viewed from one side, are made concave from the corner $a$ to the corner $b$, which is diagonally opposite, and convex from $d$ to $e$, so that when laid upon the lower end of the standard the curve of the shovel from $a$ to $b$ will just fit that of the standard, to which it is bolted through the countersunk holes $c$, which are in line with the corners. The curve of the plate from the corner $d$ to $e$ is convex, and of the same radius as the curve $a\,b$, and when the plate is turned over and laid upon the standard, with the corners $d\,e$ in line with it, this curve fits in the same manner as the curve $a\,b$ fits from the opposite side. The holes $i$ are in line with the angles $d\,e$, and are countersunk from the side opposite to that on which the holes $c$ are countersunk, so that when the plates are reversed these holes serve to bolt them to the same holes in the standard. The holes $c$ and $i$ are near the center of the plate, and the plates may thus be used with one side up by reversing them until both points $a$ and $b$ are worn off, when by turning the plate the other side up the points $d$ and $e$ may also be used. When either side of the plate is uppermost, the vertical curve will be concave and the transverse curve will be convex, and this produces a surface which is more easily cleaned as it passes through the soil.

Having thus described my invention, what I claim as new, and desire to secure by Letters Patent, is—

1. The cranked axle upon which the pole-frame is supported, having extensions B' to the rear, in combination with the cultivator-frame having its rear end suspended from the extensions by links, and the front end from the pole by jointed links, substantially as herein described.

2. The cranked axle supporting the pole-frame, and having extensions B' to the rear, the cultivator-frame having its rear end suspended from these extensions by links, and the front end from the pole by jointed links N O, as shown, in combination with the arm P and the connecting-rod Q, substantially as herein described.

3. The cranked axle supporting the pole-frame and having extensions B', and the cultivator-frame suspended from the extensions and pole, as shown, in combination with the bent lever I having its angle fulcrumed upon the pole-frame in the rear of the axle, and the arm I', connected with the end of one of the extensions B' of the axle B and the cultivator-frame, substantially as herein described.

In witness whereof I have hereunto set my hand.

NEIL McLEAN.

Witnesses:
S. H. NOURSE,
H. C. LEE.